United States Patent
Shen et al.

(10) Patent No.: US 8,181,101 B2
(45) Date of Patent: May 15, 2012

(54) DATA BUS SYSTEM, ITS ENCODER/DECODER AND ENCODING/DECODING METHOD

(75) Inventors: Wen Bo Shen, Beijing (CN); Chao-Jun Liu, Beijing (CN); Yi Ge, Beijing (CN); Qiang Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 12/363,128

(22) Filed: Jan. 30, 2009

(65) Prior Publication Data
US 2009/0193319 A1     Jul. 30, 2009

(51) Int. Cl.
*H03L 1/00*     (2006.01)
(52) U.S. Cl. ........................... 714/823; 714/800
(58) Field of Classification Search .................. 714/800, 714/823
See application file for complete search history.

(56) References Cited

U.S. PATENT DOCUMENTS

| | | | |
|---|---|---|---|
| 6,721,918 | B2 | 4/2004 | Self et al. |
| 2001/0013838 | A1 | 8/2001 | Shin et al. |
| 2007/0229324 | A1 | 10/2007 | Visalli et al. |

OTHER PUBLICATIONS

Lin Xie, Peiliang Qiu, and Qinru Qiu; Partitioned Bus Coding for Energy Reduction; EDA Technofair Design Automation Conference Asia and South Pacific, Proceedings of the 2005 Conference on ASP-DAC 2005, Shanghai, China, vol. 2, Jan. 18-21, 2005, pp. 1280-1283, published 2005 by ACM, NY, NY; paper was printed from http://hydrogen.ws.binghamton, edu/%7Eqqiu/papers/ASPDAC05.pdf on Apr. 14, 2009.

*Primary Examiner* — Sam Rizk
(74) *Attorney, Agent, or Firm* — Suiter Swantz pc llo (57) ABSTRACT

The present application relates to a data bus system, its encoder/decoder and encoding/decoding method. The data bus encoder comprises: a bus-invert encoder for generating encoded data and invert-indication information by performing bus-invert encoding on data according to a predetermined bus-invert encoding scheme; a virtual bit-group generator for converting the invert-indication information into a virtual bit-group according to a predetermined code mapping; and an error-checking-and-correction encoder for generating an error-checking-and-correction code for a virtual word according to a predetermined error-checking-and-correction encoding scheme, wherein the number of error-checking bits is more than the number of error-correction bits at least by one in the predetermined error-checking-and-correction encoding scheme, the mapping is such that the Hamming distance between any possible value of the virtual bit-group and a reference virtual bit-group which cannot be converted into under the mapping is a fixed value, and not greater than the number of error-correction bits of the error-checking-and-correction encoding scheme, and the virtual word includes the data to be output, the virtual bit-group corresponding to the data, and at least one padding bit of a fixed value, which is configured as required by the error-checking-and-correction encoding scheme.

23 Claims, 6 Drawing Sheets

DATA BUS SYSTEM, ITS ENCODER/DECODER AND ENCODING/DECODING METHOD

CROSS-REFERENCE TO RELATED APPLICATIONS

The present application incorporates herein by reference Chinese Application Serial Number IP0711509, filed Jan. 24, 2008 entitled "AN ECC-AND-ONE-HOT-BASED BUS ENCODING METHOD TO LOWER DYNAMIC IO POWER," in its entirety.

FIELD OF THE INVENTION

The present invention relates to computer data bus, especially to a data bus system based on bus-invert encoding, as well as an encoder, decoder, encoding method and decoding method for the same.

BACKGROUND OF THE INVENTION

With the rapid development of computer technology, especially the increasing spread-out of portable calculating applications, more attention is paid on designing of low power, large scale integrated circuits (VLSI).

A bus-invert encoding technique for reducing data bus power consuming is disclosed in Mircea R. Stan and Wayne R Burleson, "Bus-invert Coding for Low-Power I/O", IEEE TRANSACTIONS ON VERY LARGE SCALE INTEGRATION (VLSI) SYSTEMS, VOL. 3, NO. I, March, 1995.

Figure 1:
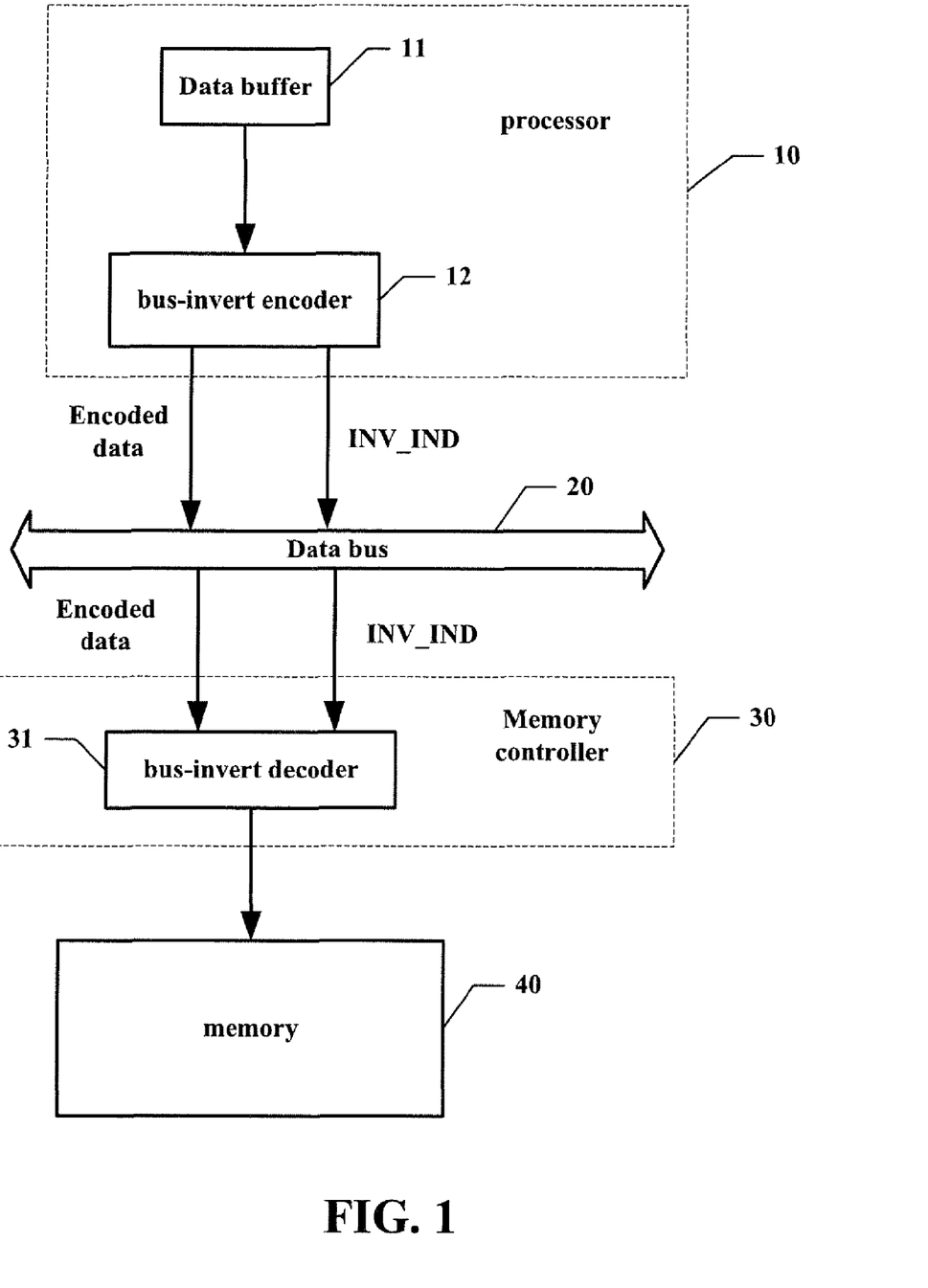
FIG. 1 schematically shows the architecture of a data bus system having the data bus encoder and decoder based on this bus-invert technique.

FIG. 1 schematically shows the architecture of a data bus system having the data bus encoder and decoder based on this bus-invert technique. As shown in FIG. 1, a processor 10 accesses a memory 40 via a data bus 20 and a memory controller 30. In the processor 10, when the processor 10 writes data to the memory 40, a bus-invert encoder 12 generates bus-invert encoded data and corresponding bus-invert indication bits (INV_IND) according to the data in a data buffer 11, and transmits the bus-invert encoded data and the bus-invert indication bits to a bus-invert decoder 31 in the memory controller 30 via the data bus 20. The bus-invert decoder 31 performs decoding on the received bus-invert encoded data according to the bus-invert indication bits, and writes the decoded data in the memory 40. Because this technique works better for buses having fewer bits, a further improvement is proposed to divide a bus having more bits into bit-groups having fewer bits to perform bus-invert encoding on the bit-group respectively. However, this solution has to provide a bus-invert indication bit for each of the bit-groups, and thus the bus-invert indication bits form invert-indication information. Additional lines are required to transmit the invert-indication information.

In view of the above insufficiency of the prior art, the inventors propose improvements on the data bus based on bus-invert encoding.

SUMMARY OF THE INVENTION

An object of the present invention is to provide a data bus system based on bus-invert encoding, and an encoder, decoder, encoding method and decoding method thereof, to reduce the cost for transmitting the invert-indication information.

An embodiment of the present invention provides a data bus encoder, including: a bus-invert encoder, configured for generating encoded data and invert-indication information by performing bus-invert encoding on data to be encoded according to a predetermined bus-invert encoding scheme; a virtual bit-group generator, configured for converting the invert-indication information into a virtual bit-group according to a predetermined code mapping; and an error-checking-and-correction (ECC) encoder for generating an error-checking-and-correction code for a virtual word according to a predetermined error-checking-and-correction encoding scheme, wherein the number of error-check bits is more than the number of error-correction bits at least by one in the predetermined error-checking-and-correction encoding scheme, wherein the mapping is such that the Hamming distance between any possible value of the virtual bit-group and a reference virtual bit-group which cannot be converted into under the mapping is a fixed value, and not greater than the number of error-correction bits of the error-checking-and-correction encoding scheme, and wherein the virtual word includes the encoded data and the virtual bit-group corresponding to the encoded data, and if there is one or more other bits which are not occupied in the virtual word, the one or more other bits take respective fixed values.

In a preferable embodiment, the data bus encoder may further include: an output selector configured for controlling the data bus encoder to output the data to be encoded when a mode control signal indicates a normal mode, and to output the encoded data when the mode control signal indicates a low power mode; and a virtual bit-group selector configured for performing control, so that the virtual word includes the data to be encoded and a fixed virtual bit-group when the mode control signal indicates the normal mode, and the virtual word includes the encoded data and the virtual bit-group corresponding to the encoded data when the mode control signal indicates the low power mode.

An embodiment of the present invention provides a data bus decoder, including: an error-checking-and-correction decoder configured for performing checkout on a virtual word according to a predetermined error-checking-and-correction encoding scheme and an error-checking-and-correction code corresponding to input data, wherein the number of error-check bits is more than the number of error-correction bits at least by one in the predetermined error-checking-and-correction encoding scheme, wherein the virtual word includes the input data and a reference virtual bit-group, and if there is one or more other bits which are not occupied in the virtual word, the one or more other bits take respective fixed values; an invert-indication information generator configured for converting a bit-group in the checked virtual word corresponding to the reference virtual bit-group in location into invert-indication information according to a predetermined decode mapping, wherein the reference virtual bit-group cannot be converted into according to the predetermined code mapping, and wherein the predetermined decode mapping is such that the Hamming distance between any possible value of the converted bit-group and the reference virtual bit-group is a fixed value, and not greater than the number of error-correction bits of the predetermined error-checking-and-correction encoding scheme; and a bus-invert decoder configured for performing bus-invert decoding on respective data to be decoded according to the invert-indication information.

In a preferable embodiment, the data bus decoder may further include: an output selector configured for controlling the data bus decoder to output data corresponding to the input data in the virtual word checked by the error-checking-and-correction decoder when a mode control signal indicates a normal mode, and controlling the data bus encoder to output data generated through decoding of the bus-invert decoder when the mode control signal indicates a low power mode;

and a bit-group selector configured for performing control, so that the virtual word includes the input data and the reference virtual bit-group when the mode control signal indicates the low power mode, and the virtual word includes the input data and the fixed virtual bit-group when the mode control signal indicates the normal mode, wherein the reference virtual bit-group is different from the fixed virtual bit-group. When the reference virtual bit-group is identical to the fixed virtual bit-group, the data bus decoder may contain no bit-group selector.

An embodiment of the present invention provides a data bus encoding method, including: generating encoded data and invert-indication information by performing bus-invert encoding on data to be encoded according to a predetermined bus-invert encoding scheme; converting the invert-indication information into a virtual bit-group according to a predetermined code mapping; and generating an error-checking-and-correction code for a virtual word according to a predetermined error-checking-and-correction encoding scheme, wherein the number of error-check bits is more than the number of error-correction bits at least by one in the predetermined error-checking-and-correction encoding scheme, wherein the mapping is such that the hamming distance between any possible value of the virtual bit-group and a reference virtual bit-group which cannot be converted into under the mapping is a fixed value, and not greater than the number of error-correction bits of the error-checking-and-correction encoding scheme, and wherein the virtual word includes the encoded data and the virtual bit-group corresponding to the encoded data, and if there is one or more other bits which are not occupied in the virtual word, the one or more other bits take respective fixed values.

An embodiment of the present invention provides a data bus decoding method, including: performing checking on a virtual word according to a predetermined error-checking-and-correction encoding scheme and an error-checking-and-correction code corresponding to input data, wherein the number of error-check bits is more than the number of error-correction bits at least by one in the predetermined error-checking-and-correction encoding scheme, wherein the virtual word includes the input data and a reference virtual bit-group, and if there is one or more other bits which are not occupied in the virtual word, the one or more other bits take respective fixed values; converting a bit-group in the checked virtual word corresponding to the reference virtual bit-group in location into invert-indication information according to a predetermined decode mapping, wherein the reference virtual bit-group cannot be converted into according to the predetermined code mapping, and wherein the predetermined decode mapping is such that the Hamming distance between any possible value of the converted bit-group and the reference virtual bit-group is a fixed value, and not greater than the number of error-correction bits of the predetermined error-checking-and-correction encoding scheme; and performing bus-invert decoding on respective data to be decoded according to the invert-indication information.

An embodiment of the present invention provides a data bus system, including: a bus transmitting device including the above data bus encoder; a bus receiving device including the above data bus decoder; and a data bus for connecting the bus transmitting device with the bus receiving device.

According to the embodiments of the present invention, it is possible to omit lines dedicated for delivering invert-indication information without influencing the reliability of data bus transmission, because the invert-indication information is transmitted through an ECC checking mechanism without losing the basic function of the ECC checking mechanism.

According to the preferable embodiments of the present invention, it is possible to achieve an enhanced applicability because the ECC checking mechanism is used to deliver the invert-indication information in case of low transmission error rate and the normal function of the ECC checking mechanism is resumed in case of high transmission error rate.

BRIEF DESCRIPTION OF THE DRAWINGS

The above and/or other aspects, features and/or advantages of the present invention will be easily appreciated in view of the following description by referring to the accompanying figures, wherein.

The embodiments of the present invention are below described by referring to the drawings. It is to be noted that, for purpose of clarity, representations and descriptions about those components and processes known by those skilled in the art but unrelated to the present invention are omitted in the drawings and the description.

Figure 2:
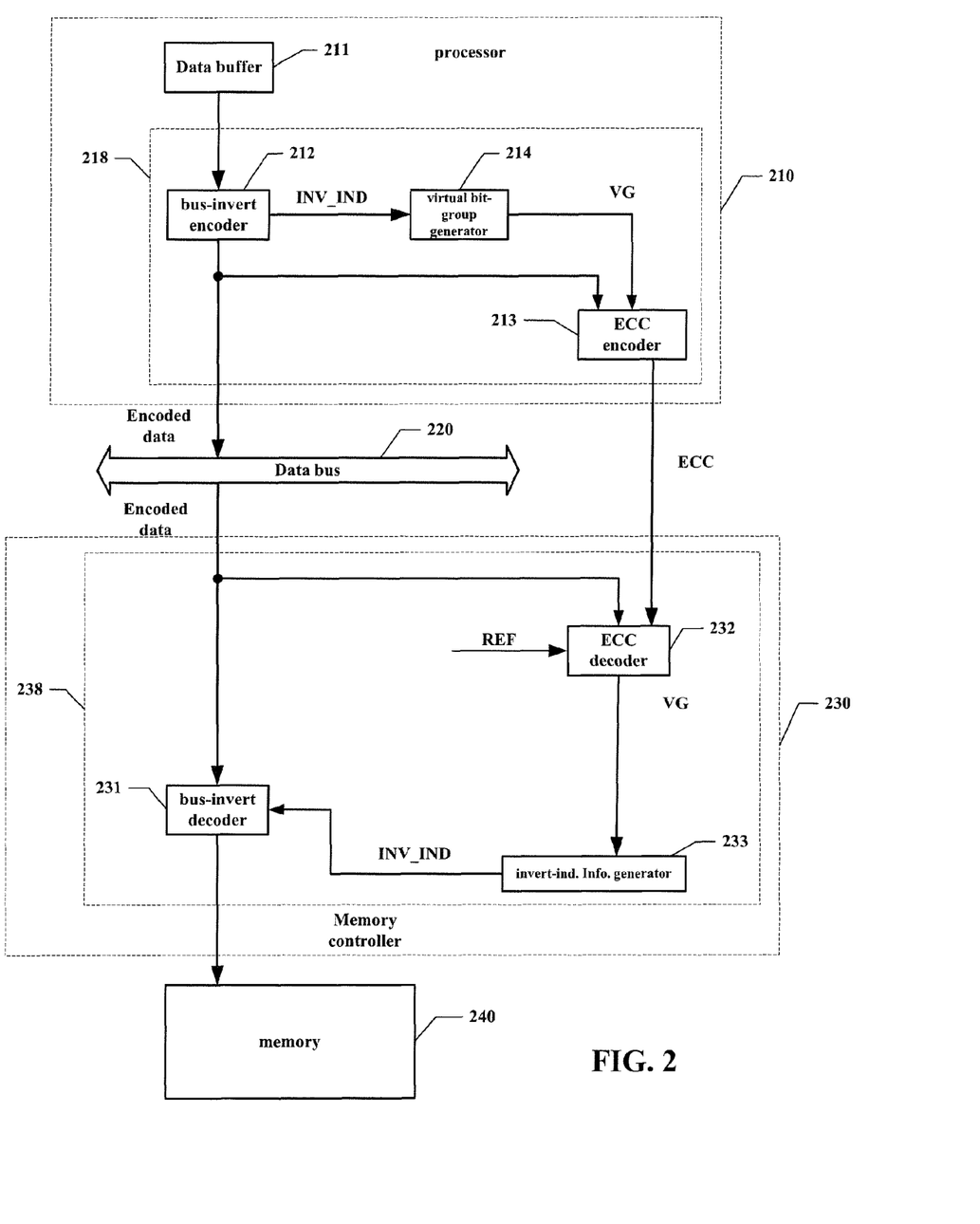
FIG. 2 schematically shows a block diagram of the structure of a data bus encoder and a data bus decoder according to an embodiment of the present invention.

FIG. 2 schematically shows a block diagram of the structure of a data bus encoder and a data bus decoder according to an embodiment of the present invention. As shown in FIG. 2, a processor 210 accesses a memory 240 via a data bus 220 and a memory controller 230. In addition to other components, the processor 210 includes a data buffer 211 and a data bus encoder 218. In addition to other components, the memory controller 230 includes a data bus decoder 238.

The data bus encoder 218 includes a bus-invert encoder 212, a virtual bit-group generator 214 and an error-checking-and-correction (ECC) encoder 213.

Specific details about the ECC encoding technique may be found in the following references. For example, a single-bit error-correction, double-bit error-detection (SECDED) solution as well as an ECC encoder and decoder in the memory are described in M. Y. Hsiao, "A class of optimal minimum odd-weight-column sec-ded codes", IBM J. Res Develop, 14 (4), July, 1970, and U.S. Pat. No. 4,334,309. The ECC encoding scheme may also include single-bit error-correction, three-bit error-detection (SEC-TED), double-bit error-correction, three-bit error-detection (DEC-TED), three-bit error-correction, four-bit error-detection (TEC-QED) and so on. For example, a technique for providing fault tolerance capability to the data bus by using the ECC code is described in U.S. Pat. No. 5,630,056. The ECC encoding scheme may employ Hamming code or optimal odd-weight code, but is not limited to these codes.

The number of bits of the data bus 220 (i.e., the number of bits of the data to be subjected to bus-invert encoding) may be M, and the data may be divided into N bit-groups. Then, with respect to data to be sent coming from the data buffer 211, the bus-invert encoder 212 performs bus-invert encoding on N bit-groups of the data respectively to generate encoded data and respective N-bit invert-indication information (INV_IND), each of bits of which indicates the bus-invert state of respective of the bit-groups. Therefore, the invert-indication information may take one of $2^N$ values of $0\sim 2^N-1$.

It is to be noted that the source of the data to be sent is not limited to the data buffer 211. The source may be other portions accessible to the bus-invert encoder 212

The virtual bit-group generator 214 converts the invert-indication information into a virtual bit-group (VG) according to a predetermined code mapping.

The ECC encoder 213 calculates an ECC code for the virtual word according to an ECC encoding scheme. The virtual word may be of L bits, the number of error-correction bits is H ($H \geq 1$), and the number of error-checking bits is I ($I>H$), under the ECC encoding scheme. The number of bits of the virtual bit-group may be J, where $M+J \leq L$. If $M+J=L$, the virtual word includes M-bit data and a J-bit virtual bit-group. If $M+J<L$, it is possible to make up L bits by using padding bits, i.e., the virtual word includes the M-bit data, the J-bit virtual bit-group and one or more padding bits. Each padding bit may take a predetermined value, as long as it takes the same value at both encoding side and decoding side.

The value domain of the virtual bit-group may include $2^N$ J-bit bit-strings different from each other. The predetermined code mapping used by the virtual bit-group generator 214 includes one-to-one correspondences between these $2^N$ J-bit bit-strings and $2^N$ possible values of the invert-indication information. The reference virtual bit-group REF may be a J-bit bit-string taking a value outside of the above value domain, the number of different bits (i.e., Hamming distance) between the reference virtual bit-group REF and each of the $2^N$ J-bit bit-strings is constant, and $K \leq H$. As described below, when K=H, the error-correction capability of the ECC encoding scheme is used for transferring the invert-indication information, with the basic error-detection capability (I-H bits) being maintained; When K<H, a portion of error-correction capability of the ECC encoding scheme is used for transferring the invert-indication information, and the remained error-correction capability is used for error-correction of data, with a certain error-detection capability (I-H bits) being maintained.

Figure 3:
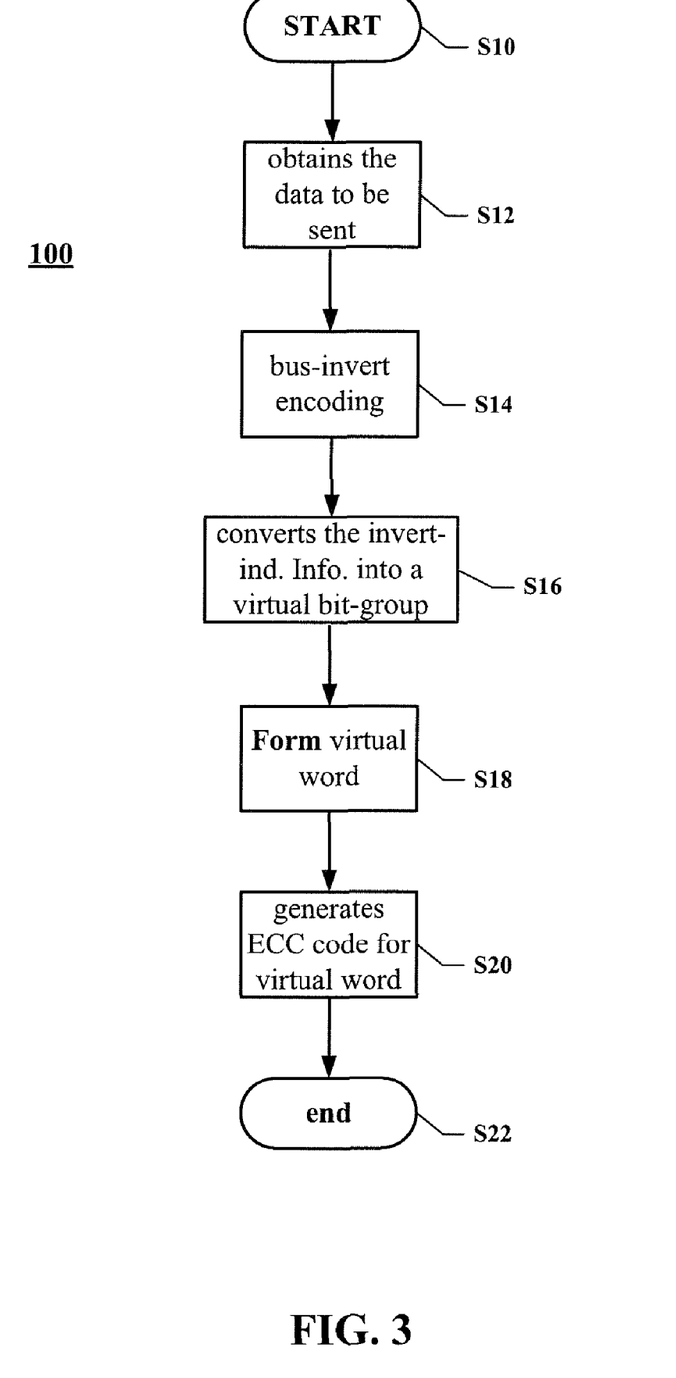
FIG. 3 shows a flow chart of an encoding method in the data bus encoder.

FIG. 3 shows a flow chart of an encoding method 100 in the data bus encoder 218. As shown in FIG. 3, the method 100 starts from step S10. At step S12, the bus-invert encoder 212 obtains the data to be sent, from the data buffer 211. At step S14, the bus-invert encoder 212 generates bus-invert encoded data and corresponding invert-indication information for the data to be sent. At step S16, the virtual bit-group generator 214 converts the invert-indication information into a virtual bit-group according to a predetermined code mapping. At step S18, a virtual word is formed in the ECC encoder 213. The virtual word includes the bus-invert encoded data from the bus-invert encoder 212, the virtual bit-group from the virtual bit-group generator 214, and padding bits (not shown) having fixed values configured if required. It is to be noted that if M+J equals to L, no padding bit is needed in the virtual word; If M+J is less than L, (L−M−J) padding bits are needed in the virtual word. The padding bits may be stored within or outside of the ECC encoder 213. At step S20, the ECC encoder 213 generates an ECC code for the virtual word according to the predetermined ECC encoding scheme. The method 100 ends at step S22.

The data encoded by the data bus encoder 218 is transmitted to the data bus decoder 238 through the data bus 220. The ECC code generated by the ECC encoder 213 is also transmitted to the data bus decoder 238.

The data bus decoder 238 includes a bus-invert decoder 231, an ECC decoder 232 and an invert-indication information generator 233.

In the ECC decoder 232, a virtual word of L bits is formed with the M-bit encoded data from the bus-invert encoder 212, the J-bit reference virtual bit-group REF, and one or more possible padding bits having the same values with those described in connection with the ECC encoder 213 heretofore. It is to be noted that if M+J equals to L, no padding bit is needed in the virtual word; If M+J is less than L, (L−M−J) padding bits are needed in the virtual word. The ECC decoder 232 performs checking according to the virtual word and the received ECC code. The bit distribution of the encoded data, the reference virtual bit-group REF and the padding bits in the virtual word at the decoding side is identical to that of the M-bit data, the J-bit virtual bit-group and one or more padding bits in the virtual word at the ECC encoder 213. The bit distribution may be based on the sequence cited in the above, or may be based on other sequence such as bit interleaving or changing bit order. Because there is definitely K but only K bits having different values between the virtual bit-group and the reference virtual bit-group REF, K bit errors are caused intentionally. In case that the number of bit errors as checked is less than H, the ECC decoder 232 is at least able to correct these K bit errors to recover the value of the virtual bit-group. The reference virtual bit-group REF and the padding bits may be stored within or outside of the ECC decoder 232.

As noted earlier, when K=H, the error-correction capability of the ECC encoding scheme is used for transferring the invert-indication information, with the basic error-detection capability (I-H bits) being maintained. In this case, the input to the bus-invert decoder may be data directly from the data bus (as shown in FIG. 2), or may be checked data from the ECC decoder (not shown). When K<H, a portion of error-correction capability of the ECC encoding scheme is used for transferring the invert-indication information, and the remained error-correction capability is used for error-correction of data, with a certain error-detection capability (I-H bits) being maintained. In this case, the input to the bus-invert decoder should be checked data from the ECC decoder (not shown). These two cases are applicable to the embodiments of FIGS. 2 and 6.

The invert-indication information generator 233 converts the recovered virtual bit-group into invert-indication information according to the predetermined decode mapping, i.e., an inverse mapping of the predetermined decode mapping.

The bus-invert encoder 231 performs bus-invert decoding on the received bus-invert encoded data according to the invert-indication information from the invert-indication information generator 233. The decoded data is stored in the memory 240. It is to be noted that, with respect to the ECC mechanism for memory, it is possible to consider the decoded data as the data directly coming from the data bus, and thus the data bus decoder can be easily combined with the ECC mechanism for memory.

If K<H, i.e., a portion of error-correction capability of the ECC encoding scheme is used for error-correction of data, then in an embodiment, the data to be decoded by the bus-invert decoder is the data checked by the ECC decoder.

Figure 4:
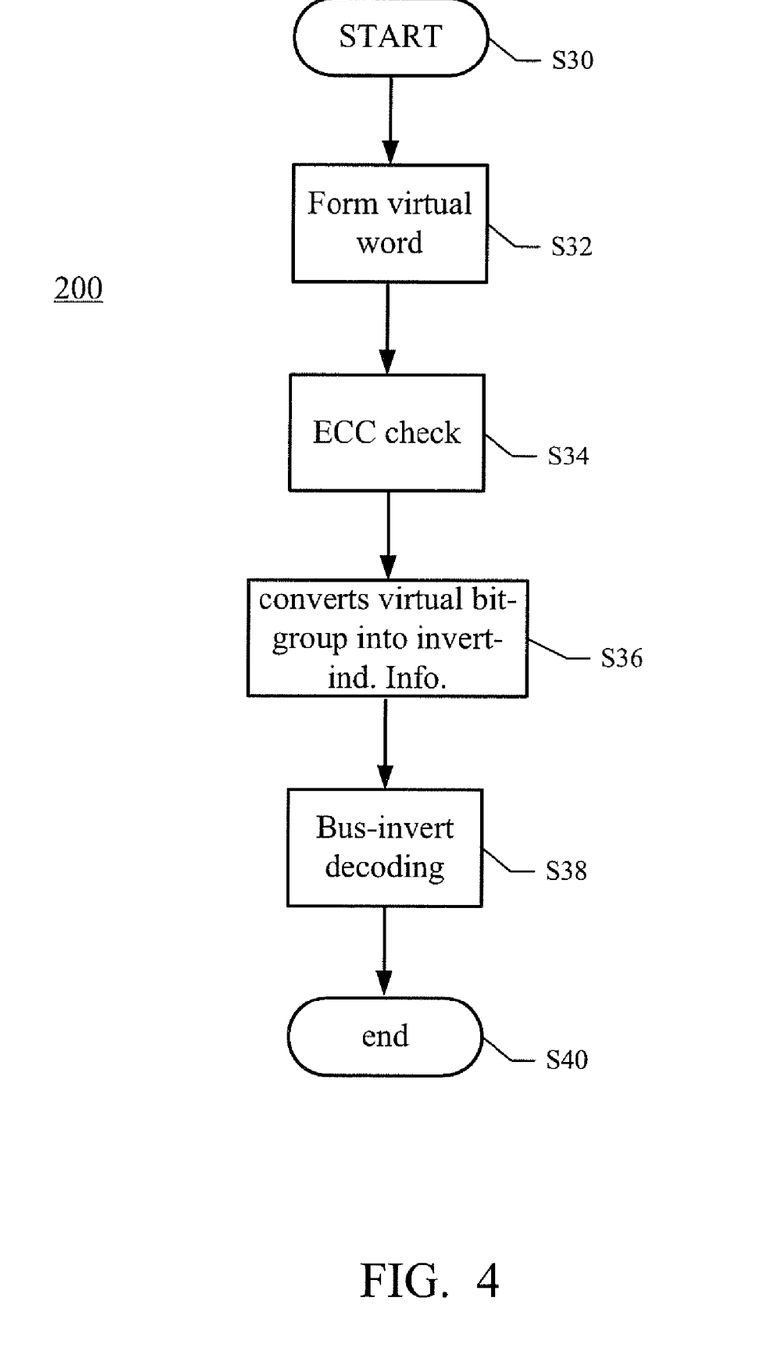
FIG. 4 shows a flow chart of a decoding method in the data bus decoder.

FIG. 4 shows a flow chart of a decoding method 200 in the data bus decoder 238. As shown in FIG. 4, the method 200 starts from step S30. At step S32, a virtual word is formed in the ECC decoder 232. At step S34, the ECC decoder 232 performs checking according to the formed virtual word and the received ECC code, to recover the virtual bit-group. At step S36, the invert-indication information generator 233 converts the recovered virtual bit-group into invert-indication information according to the predetermined decode mapping. At step S38, the bus-invert encoder 231 performs bus-invert decoding on the received bus-invert encoded data according to the invert-indication information. At step S40, the method 200 ends.

Figure 5:
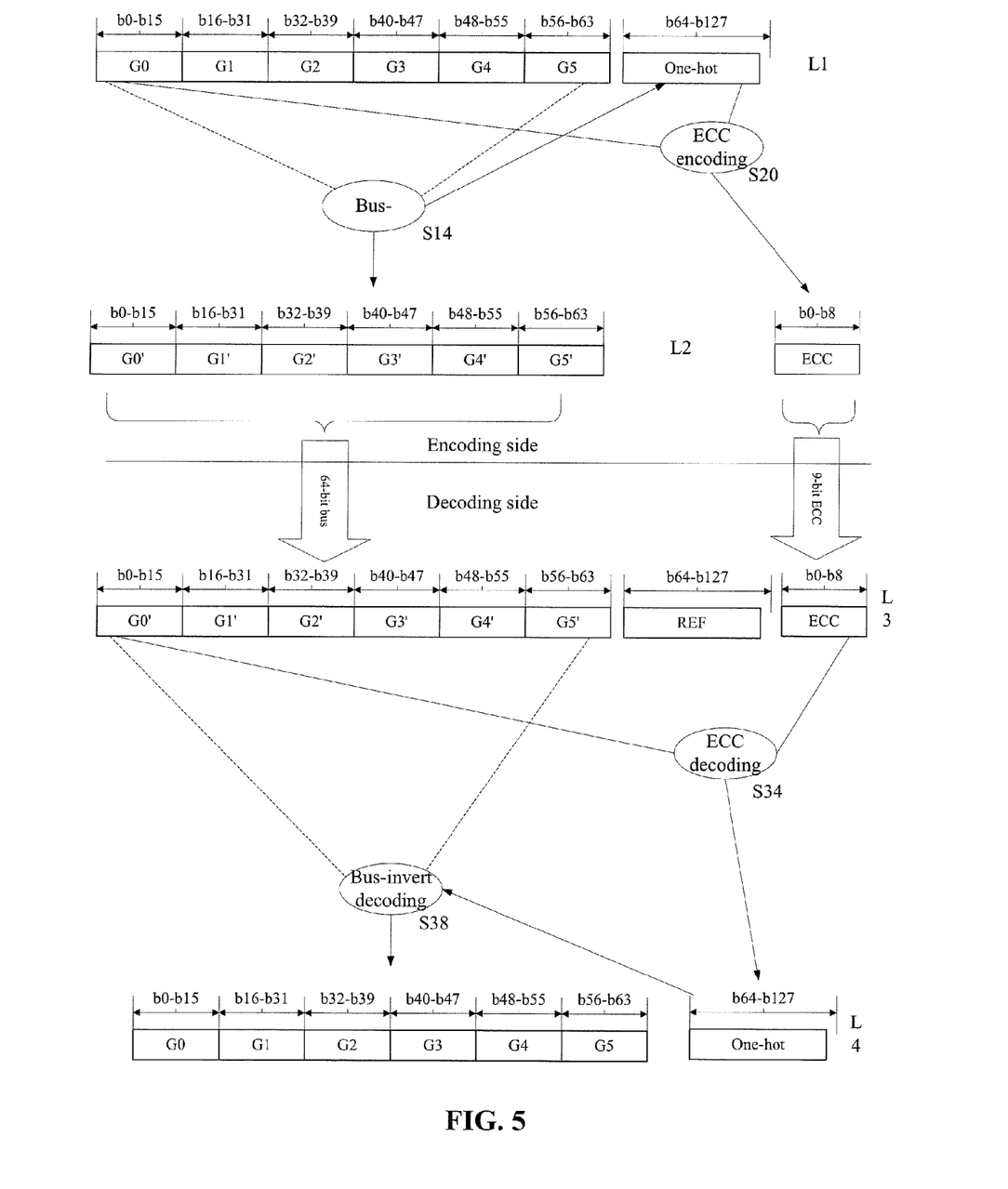
FIG. 5 is a data view for schematically showing the data processed by the encoding/decoding method according to the embodiment of the present invention.

FIG. 5 is a data view for schematically showing the data processed by the encoding/decoding method according to the embodiment of the present invention. In the case as shown in FIG. 5, the data is of 64 bits (M=64), and is divided into 6 bit-groups (N=6, 16 bits/16 bits/8 bits/8 bits/8 bits/8 bits). The virtual bit-group is based on 64-bit ONE-HOT code (J=64, K=1). The ECC encoding scheme is 9-bit SECDED ECC code (L=128, H=1, I=2). ONE-HOT code is a code where the number of bits is equal to the number of states which can be represented, and each code value has one and only one bit of 1. The reference virtual bit-group REF is a 64-bit bit-string of all 0.

The method 100 is performed in the case as shown in FIG. 5. To facilitate representation, "0x" represents hex number and "0b" represents binary number in the following. After performing step S12, the obtained data to be sent is 0x0000000000000000, i.e., G0=0x0000, G1=0x0000, G2=0x00☐G3=0x00☐G4=0x00☐G5=0x00 (as shown in line L1 in FIG. 5). Assuming the previously transmitted data is 0x00000000000000ff, after bus-invert encoding of step S14 (as shown in S14 in FIG. 5), the obtained bus-invert encoded data is 0x00000000000000ff, i.e., G0'=0x0000☐G1'=0x0000☐G2'=0x00☐G3'=0x00☐G4'=0x00☐G5'=0xFF☐the invert-indication information is 0b000001, and the ONE-HOT code "one-hot" obtained after the conversion of step S16 is 0x0000000000000002 (as shown in line L2 in FIG. 5). At step S20, the bus-invert encoded data 0x00000000000000ff and "one-hot"=0x0000000000000002 form the virtual word, and the virtual word is subjected to the ECC encoding to obtain the ECC code (as shown in line L2 in FIG. 5).

Referring to FIG. 5, the method 200 is performed. The virtual word before decoding includes encoded data 0x00000000000000ff, i.e., G0'=0x0000☐G1'=0x0000☐G2'=0x00☐G3'=0x00☐G4'=0x00☐G5'=0xFF, and reference virtual bit-group REF 0x0000000000000000 (as shown in line L3 in FIG. 5). The virtual word is checked according to the ECC code (as shown in S34 in FIG. 5). The checked virtual word includes encoded data 0x00000000000000ff and a ONE-HOT code "one-hot"=0x0000000000000002. The invert-indication information 0b000001 is obtained through the ONE-HOT decoding at step S36. The bus-invert encoded data 0x00000000000000ff is decoded into 0x0000000000000000 according to the invert-indication information 0b000001 (as shown in line L4 in FIG. 5).

Figure 6:
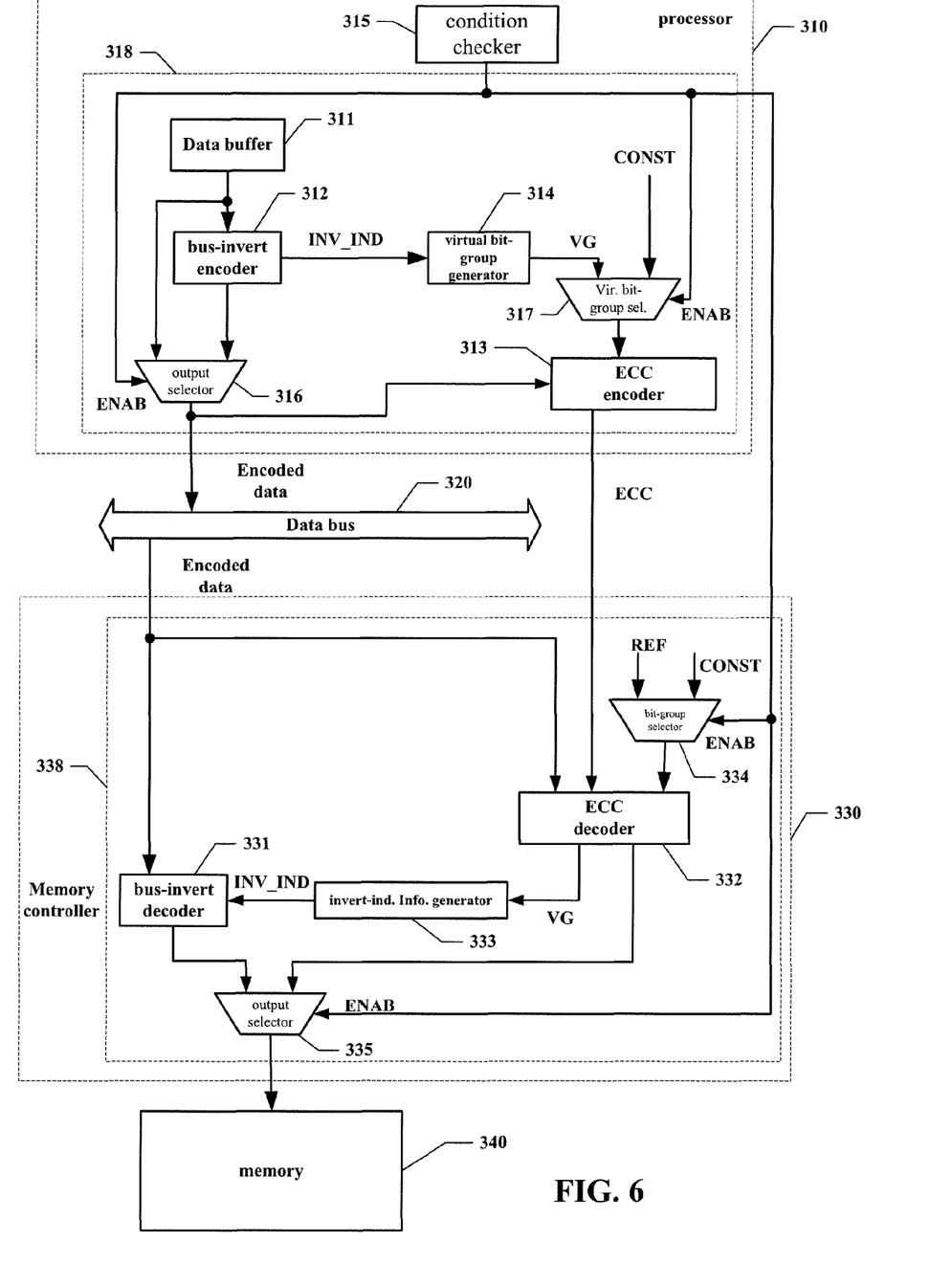
FIG. 6 schematically shows a block diagram of the structure of a data bus encoder and a data bus decoder according to a preferable embodiment of the present invention.

FIG. 6 schematically shows a block diagram of the structure of a data bus encoder and a data bus decoder according to a preferable embodiment of the present invention. As shown in FIG. 6, a processor 310 accesses a memory 340 via a data bus 320 and a memory controller 330. In addition to other components, the processor 310 includes a data buffer 311, a data bus encoder 318 and a condition checker 315. In addition to other components, the memory controller 330 includes a data bus decoder 338. The data bus encoder 318 includes a bus-invert encoder 312, a virtual bit-group generator 314, an ECC encoder 313, an output selector 316 and a virtual bit-group selector 317. The data bus decoder 338 includes a bus-invert decoder 331, an ECC decoder 332, an invert-indication information generator 333, a bit-group selector 334 and an output selector 335.

The bus-invert encoder 312, virtual bit-group generator 314, ECC encoder 313, bus-invert decoder 331, ECC decoder 332 and invert-indication information generator 333 are similar to the bus-invert encoder 212, virtual bit-group generator 214, ECC encoder 213, bus-invert decoder 231, ECC decoder 232, and invert-indication information generator 233, and thus will not be described in detail.

As known in the art, when the ECC decoder at the receiving party detects an uncorrectable error through checking (for example, the number of bit errors is equal to the number of error-checking bits), it will report an ECC error. The reporting may be implemented through flag bit, interruption, signal line and so on. The transmitting party generally retransmits the data and the ECC code in response to be informed of the ECC error.

In the embodiment as shown in FIG. 2, if some factors such as environmental conditions cause an increased frequency of occurrence of random errors in data bus transmission, the data retransmission will occur more frequently. When the frequency of occurrence increases to a certain degree, the retransmission overhead may counteract the gain of reduced power brought by the bus-invert encoding, and even cause an increased power consuming. In this case, it performs better to stop the bus-invert encoding and resume the normal function of ECC encoding.

In the embodiment as shown in FIG. 6, the condition checker 315 collects information relating to ECC errors, and calculating the current frequency of occurrence of ECC errors according to the collected information. Alternatively, the condition checker 315 may also collect environmental condition data (for example, temperature in the enclosure) measured by relevant sensors, and determine corresponding frequency of occurrence of ECC errors according to a relation curve between the previously measured frequency of occurrence of ECC errors and the environmental conditions.

Regularly or in response to the updating of the frequency of occurrence, the condition checker 315 compare the obtained frequency of occurrence of ECC errors with a predetermined threshold. If the frequency of occurrence of ECC errors is greater than the predetermined threshold, the mode control signal ENAB is set to indicate a normal mode; otherwise, the mode control signal ENAB is set to indicate a low power mode.

The output selector 316 is controlled by the mode control signal ENAB, and may be a switch or a multiplexer, for example. When the mode control signal ENAB indicates the low power mode, the output selector 316 outputs the encoded data from the bus-invert encoder 312. When the mode control signal ENAB indicates the normal mode, the output selector 316 outputs the data from the data buffer 311. The output selector 316 may also be implemented h the bus-invert encoder 312.

The virtual bit-group selector 317 is similar to the output selector 316. When the mode control signal ENAB indicates the low power mode, the virtual bit-group selector 317 selects the virtual bit-group from the virtual bit-group generator 314 as the input to the ECC encoder 313. When the mode control signal ENAB indicates the normal mode, the virtual bit-group selector 317 selects a J-bit bit-group having a fixed value (fixed virtual bit-group CONST) as the input to the ECC encoder 313, so that the virtual word in the ECC encoder 313 includes the data without bus-invert encoding, the J-bit bit-group and possible padding bits. The virtual bit-group selector 317 may also be implemented in the ECC encoder 313.

The output selector 335 is similar to the output selector 316. When the mode control signal ENAB indicates the low power mode, the output selector 335 outputs the decoded data from the bus-invert decoder 331. When the mode control signal ENAB indicates the normal mode, the output selector 335 outputs the decoded data from the ECC decoder 332. The output selector 335 may also be implemented in the bus-invert decoder 331 or in the ECC decoder 332.

The bit-group selector 334 is similar to the output selector 316. When the mode control signal ENAB indicates the low power mode, the bit-group selector 334 selects the reference virtual bit-group REF as the input to the ECC decoder 332. When the mode control signal ENAB indicates the normal mode, the bit-group selector 334 selects a J-bit bit-group having a fixed value (fixed virtual bit-group CONST) as the input to the ECC decoder 332, so that the virtual word in the ECC decoder 332 includes the data received from the bus, the J-bit bit-group and possible padding bits. The bit-group selector 334 may also be implemented in the ECC decoder 332.

It is to be noted that the bit-group selector 334 may be omitted when the reference virtual bit-group REF is identical to the fixed virtual bit-group CONST.

Under most operating conditions, the error rate in the data bus transmission is very low. Therefore, one-bit error-detection capability is usually sufficient to meet the basic requirement from the reliability of data bus transmission, with the redundant error-correction and error-detection capability being wasted. The embodiment of FIG. 6 can avoid this waste.

Although the data bus I/O between the processor and the memory is taken as an example to describe the embodiments of the present invention in the above, the data bus encoder and the data bus decoder of the present invention are applicable to any functional unit performing I/O through the data bus. Further, these functional units may be positioned on the same chip, or on different chips. The data bus encoder and the data bus decoder may be within respective functional units, or may be separated there from.

Although the embodiments of the present invention are described for one-way I/O in the above, the data bus encoder and the data bus decoder of the present invention may be merged in the same functional unit to achieve two-way I/O.

Further, the data bus encoder and its components, the data bus decoder and its components, and the condition checker of the present invention may be implemented through hardware (for example, logic circuit, programmable logic and etc.), software (for example, program running on a processing unit) or a combination of hardware and software.

Therefore, although the embodiments of the present invention are described in the above by referring to examples of specific configurations, the data bus encoder and the data bus decoder of the present invention are not limited to the described specific configurations. In fact, respective components may be combined arbitrarily as required in the data bus encoder and the data bus decoder of the present invention. Similarly, although the condition checker is described within the processor in the above examples, the condition checker may be positioned at any location in the bus system, where the error report can be obtained. For example, the condition checker may be implemented in the memory controller or as an independent unit, obtain the error report through flag bit, interruption, signal line and etc., and provide the mode control signal to the data bus encoder and the data bus decoder. Further, the condition checker may switch the mode control signal in response to external control from switch, key, operation system, application and so on.

The present invention is described in the above by referring to specific embodiments. One skilled in the art should understand that various modifications and changes can be made without departing from the scope as set forth in the following claims.

The invention claimed is:

1. A data bus encoder, comprising:
a bus-invert encoder, configured for generating encoded data and invert-indication information by performing bus-invert encoding on data to be encoded according to a predetermined bus-invert encoding scheme;
a virtual bit-group generator, configured for converting the invert-indication information into a virtual bit-group according to a predetermined code mapping; and
an error-checking-and-correction encoder for generating an error-checking-and-correction code for a virtual word according to a predetermined error-checking-and-correction encoding scheme, wherein the number of error-check bits is more than the number of error-correction bits at least by one in the predetermined error-checking-and-correction encoding scheme,
wherein the mapping is such that the hamming distance between any possible value of the virtual bit-group and a reference virtual bit-group which cannot be converted into under the mapping is a fixed value, and not greater than the number of error-correction bits of the error-checking-and-correction encoding scheme, and
wherein the virtual word includes the encoded data and the virtual bit-group corresponding to the encoded data, and if there is one or more other bits which are not occupied in the virtual word, the one or more other bits take respective fixed values.

2. The data bus encoder of claim 1, further comprising:
an output selector configured for controlling the data bus encoder to output the data to be encoded when a mode control signal indicates a normal mode, and to output the encoded data when the mode control signal indicates a low power mode; and
a virtual bit-group selector configured for performing control, so that the virtual word includes the data to be encoded and a fixed virtual bit-group when the mode control signal indicates the normal mode, and the virtual word includes the encoded data and the virtual bit-group corresponding to the encoded data when the mode control signal indicates the low power mode.

3. The data bus encoder of claim 2, further comprising: a bus state checker for calculating a frequency of occurrence of uncorrectable error-checking-and-correction errors in data transmission on the data bus, and determining the mode control signal according to the frequency of occurrence.

4. The data bus encoder of claim 3, wherein the bus state checker is configured for determining the frequency of occurrence according to environmental condition of the data bus.

5. The data bus encoder of claim 1, wherein the predetermined error-checking-and-correction encoding scheme has at least a capability of one-bit error-correction and two-bit error-detection.

6. The data bus encoder of claim 1, wherein the code applied in the predetermined error-checking-and-correction encoding scheme is selected from a group comprising Hamming code and optimal odd-weight-column code.

7. The data bus encoder of claim 1, wherein the predetermined code mapping comprises one-hot code.

8. The data bus encoder of claim 1, wherein the predetermined error-checking-and-correction encoding scheme is an optimal odd-weight-column code of one-bit error-correction and two-bit error-detection, the predetermined code mapping is a 64-bit one-hot code, the data to be encoded has 64 bits, and the data to be encoded is divided into 6 bit-groups for respective bus-invert encoding according to the predetermined bus-invert encoding scheme.

9. A data bus decoder, comprising:
- an error-checking-and-correction decoder configured for performing checking on a virtual word according to a predetermined error-checking-and-correction encoding scheme and an error-checking-and-correction code corresponding to input data, wherein the number of error-check bits is more than the number of error-correction bits at least by one in the predetermined error-checking-and-correction encoding scheme, wherein the virtual word includes the input data and a reference virtual bit-group, and if there is one or more other bits which are not occupied in the virtual word, the one or more other bits take respective fixed values;
- an invert-indication information generator configured for converting a bit-group in the checked virtual word corresponding to the reference virtual bit-group in location into invert-indication information according to a predetermined decode mapping, wherein the reference virtual bit-group cannot be converted into according to the predetermined code mapping, and wherein the predetermined decode mapping is such that the Hamming distance between any possible value of the converted bit-group and the reference virtual bit-group is a fixed value, and not greater than the number of error-correction bits of the predetermined error-checking-and-correction encoding scheme; and
- a bus-invert decoder configured for performing bus-invert decoding on respective data to be decoded according to the invert-indication information.

10. The data bus decoder of claim 9, further comprising:
- an output selector configured for controlling the data bus decoder to output data corresponding to the input data in the virtual word checked by the error-checking-and-correction decoder when a mode control signal indicates a normal mode, and controlling the data bus decoder to output data generated through decoding of the bus-invert decoder when the mode control signal indicates a low power mode; and
- a bit-group selector configured for performing control, so that the virtual word includes the input data and the reference virtual bit-group when the mode control signal indicates the low power mode, and the virtual word includes the input data and the fixed virtual bit-group when the mode control signal indicates the normal mode, wherein the reference virtual bit-group is different from the fixed virtual bit-group.

11. The data bus decoder of claim 10, further comprising: a bus state checker for calculating a frequency of occurrence of uncorrectable error-checking-and-correction errors in data transmission on the data bus, and determining the mode control signal according to the frequency of occurrence.

12. The data bus decoder of claim 11, wherein the bus state checker is configured for determining the frequency of occurrence according to environmental condition of the data bus.

13. The data bus decoder of claim 9, further comprising:
- an output selector configured for controlling the data bus decoder to output data corresponding to the input data in the virtual word checked by the error-checking-and-correction decoder when a mode control signal indicates a normal mode, and controlling the data bus decoder to output data generated through decoding of the bus-invert decoder when the mode control signal indicates a low power mode, wherein the reference virtual bit-group is identical to the fixed virtual bit-group.

14. The data bus decoder of claim 9, wherein the predetermined error-checking-and-correction encoding scheme has at least a capability of one-bit error-correction and two-bit error-detection.

15. The data bus decoder of claim 9, wherein the code applied in the predetermined error-checking-and-correction encoding scheme is selected from a group comprising Hamming code and optimal odd-weight-column code.

16. The data bus decoder of claim 9, wherein the predetermined decode mapping comprises one-hot code.

17. The data bus decoder of claim 9, wherein the predetermined error-checking-and-correction encoding scheme is an optimal odd-weight-column code of one-bit error-correction and two-bit error-detection, the predetermined decode mapping is a 64-bit one-hot code, the data to be decoded has 64 bits, and the data to be decoded is divided into 6 bit-groups for respective bus-invert decoding according to the predetermined bus-invert encoding scheme.

18. The data bus decoder of claim 9, wherein the data to be decoded is the input data, and the Hamming distance is equal to the number of error-correction bits of the predetermined error-checking-and-correction encoding scheme.

19. A data bus encoding method, comprising:
- generating encoded data and invert-indication information by performing bus-invert encoding on data to be encoded according to a predetermined bus-invert encoding scheme;
- converting the invert-indication information into a virtual bit-group according to a predetermined code mapping;
- generating an error-checking-and-correction code for a virtual word according to a predetermined error-checking-and-correction encoding scheme, wherein the number of error-check bits is more than the number of error-correction bits at least by one in the predetermined error-checking-and-correction encoding scheme, wherein the mapping is such that the hamming distance between any possible value of the virtual bit-group and a reference virtual bit-group which cannot be converted into under the mapping is a fixed value, and not greater than the number of error-correction bits of the error-checking-and-correction encoding scheme; and
- wherein the virtual word includes the encoded data and the virtual bit-group corresponding to the encoded data, and if there is one or more other bits which are not occupied in the virtual word, the one or more other bits take respective fixed values.

20. A data bus decoding method, comprising:
- performing checking on a virtual word according to a predetermined error-checking-and-correction encoding scheme and an error-checking-and-correction code corresponding to input data, wherein the number of error-check bits is more than the number of error-correction bits at least by one in the predetermined error-checking-and-correction encoding scheme, wherein the virtual word includes the input data and a reference virtual bit-group, and if there is one or more other bits which are not occupied in the virtual word, the one or more other bits take respective fixed values;
- converting a bit-group in the checked virtual word corresponding to the reference virtual bit-group in location into invert-indication information according to a predetermined decode mapping, wherein the reference virtual bit-group cannot be converted into according to the predetermined code mapping, and wherein the predetermined decode mapping is such that the hamming distance between any possible value of the converted bit-group and the reference virtual bit-group is a fixed value, and not greater than the number of error-correction bits of the predetermined error-checking-and-correction encoding scheme; and performing bus-invert decoding on respective data to be decoded according to the invert-indication information.

21. A data bus system, comprising:

a bus transmitting device including:
- a bus-invert encoder, configured for generating encoded data and invert-indication information by performing bus-invert encoding on data to be encoded according to a predetermined bus-invert encoding scheme;
- a virtual bit-group generator, configured for converting the invert-indication information into a virtual bit-group according to a predetermined code mapping;
- an error-checking-and-correction encoder for generating an error-checking-and-correction code for a virtual word according to a predetermined error-checking-and-correction encoding scheme, wherein the number of error-check bits is more than the number of error-correction bits at least by one in the predetermined error-checking-and-correction encoding scheme;
- wherein the mapping is such that the hamming distance between any possible value of the virtual bit-group and a reference virtual bit-group which cannot be converted into under the mapping is a fixed value, and not greater than the number of error-correction bits of the error-checking-and-correction encoding scheme, and
- wherein the virtual word includes the encoded data and the virtual bit-group corresponding to the encoded data, and if there is one or more other bits which are not occupied in the virtual word, the one or more other bits take respective fixed values;

a bus receiving device including:
- an error-checking-and-correction decoder configured for performing checking on a virtual word according to a predetermined error-checking-and-correction encoding scheme and an error-checking-and-correction code corresponding to input data, wherein the number of error-check bits is more than the number of error-correction bits at least by one in the predetermined error-checking-and-correction encoding scheme, wherein the virtual word includes the input data and a reference virtual bit-group, and if there is one or more other bits which are not occupied in the virtual word, the one or more other bits take respective fixed values;
- an invert-indication information generator configured for converting a bit-group in the checked virtual word corresponding to the reference virtual bit-group in location into invert-indication information according to a predetermined decode mapping, wherein the reference virtual bit-group cannot be converted into according to the predetermined code mapping, and wherein the predetermined decode mapping is such that the Hamming distance between any possible value of the converted bit-group and the reference virtual bit-group is a fixed value, and not greater than the number of error-correction bits of the predetermined error-checking-and-correction encoding scheme; and
- a bus-invert decoder configured for performing bus-invert decoding on respective data to be decoded according to the invert-indication information; and a data bus for connecting the bus transmitting device with the bus receiving device.

22. The data bus system of claim 21, wherein the data bus encoder further comprises:
- an output selector configured for controlling the data bus encoder to output the data to be encoded when a mode control signal indicates a normal mode, and to output the encoded data when the mode control signal indicates a low power mode; and
- a virtual bit-group selector configured for performing control, so that the virtual word includes the data to be encoded and a fixed virtual bit-group when the mode control signal indicates the normal mode, and the virtual word includes the encoded data and the virtual bit-group corresponding to the encoded data when the mode control signal indicates the low power mode, wherein the data bus decoder further comprises;
- an output selector configured for controlling the data bus decoder to output data corresponding to the input data in the virtual word checked by the error-checking-and-correction decoder when a mode control signal indicates a normal mode, and controlling the data bus decoder to output data generated through decoding of the bus-invert decoder when the mode control signal indicates a low power mode; and
- a bit-group selector configured for performing control, so that the virtual word includes the input data and the reference virtual bit-group when the mode control signal indicates the low power mode, and the virtual word includes the input data and the fixed virtual bit-group when the mode control signal indicates the normal mode, wherein the reference virtual bit-group is different from the fixed virtual bit-group.

23. The data bus system of claim 22, further comprising: a bus state checker for calculating a frequency of occurrence of uncorrectable error-checking-and-correction errors in data transmission on the data bus, and determining the mode control signal according to the frequency of occurrence.

* * * * *